US010436354B1

(12) United States Patent
Currey et al.

(10) Patent No.: US 10,436,354 B1
(45) Date of Patent: Oct. 8, 2019

(54) RESERVOIR AND METHODS OF FORMING

(71) Applicant: Mercury Plastics LLC, Middlefield, OH (US)

(72) Inventors: Donald Currey, Chagrin Falls, OH (US); Scott R. Gardner, Chagrin Falls, OH (US); Brock Elsea, Cortland, OH (US)

(73) Assignee: Mercury Plastics LLC, Middlefield, OH (US)

( * ) Notice: Subject to any disclaimer, the term of this patent is extended or adjusted under 35 U.S.C. 154(b) by 143 days.

(21) Appl. No.: 15/636,013

(22) Filed: Jun. 28, 2017

Related U.S. Application Data

(60) Provisional application No. 62/355,602, filed on Jun. 28, 2016.

(51) Int. Cl.
*F16L 11/12* (2006.01)
*B65H 54/58* (2006.01)
*F16L 11/04* (2006.01)
*F16L 33/00* (2006.01)

(52) U.S. Cl.
CPC .............. *F16L 11/12* (2013.01); *B65H 54/58* (2013.01); *F16L 11/04* (2013.01); *F16L 33/006* (2013.01)

(58) Field of Classification Search
CPC .............. F16L 11/12; F16L 11/04; F28D 7/04
USPC .................... 138/DIG. 11, 106, 109; 165/163
See application file for complete search history.

(56) References Cited

U.S. PATENT DOCUMENTS

| 3,828,847 | A | * | 8/1974 | Stein | F24D 3/082 122/15.1 |
| 4,862,951 | A | * | 9/1989 | Muller | B60S 1/487 165/41 |
| 5,372,185 | A | * | 12/1994 | Lannes | F24D 3/082 122/15.1 |
| 5,485,879 | A | * | 1/1996 | Lannes | F24D 3/082 122/15.1 |
| 5,906,226 | A | * | 5/1999 | Goodman | F16L 11/04 137/355.16 |
| 6,910,505 | B2 | * | 6/2005 | Weck | F16L 11/12 138/109 |
| 7,007,748 | B2 | * | 3/2006 | Gordon | F24D 3/082 165/163 |
| 7,063,133 | B2 | * | 6/2006 | Gordon | F24D 3/082 165/154 |
| 8,826,944 | B1 | * | 9/2014 | Laine | F25D 23/126 138/109 |
| 2006/0118279 | A1 | * | 6/2006 | Stafford | F28D 1/024 165/104.33 |

* cited by examiner

*Primary Examiner* — Patrick F Brinson
(74) *Attorney, Agent, or Firm* — Hahn Loeser & Parks LLP

(57) ABSTRACT

The invention described herein relates to reservoirs within appliances. The present invention includes a reservoir made of a length of reservoir tubing. In particular embodiments, the length of the reservoir tubing is formed in an overlapping circular portion and conforms to the available space requirements within an appliance. Particular embodiments of the present invention include reservoirs, reservoir systems including a reservoir, processes for forming a reservoir, and processes for forming the aforementioned reservoir systems.

20 Claims, 8 Drawing Sheets

RESERVOIR AND METHODS OF FORMING

CROSS-REFERENCE TO RELATED APPLICATIONS

This application claims priority to, and the benefit of, U.S. Provisional Application No. 62/355,602 filed on Jun. 28, 2016 with the U.S. Patent Office, which is hereby incorporated by reference.

BACKGROUND

Reservoirs are used in appliances for storing liquid and/or a water supply. An improved reservoir is needed to increase energy efficiency and improve the fluid dynamics of the system.

SUMMARY OF THE INVENTION

The invention described herein relates to reservoirs within appliances. The present invention includes a reservoir made of a length of reservoir tubing. In particular embodiments, the length of the reservoir tubing is in an overlapping circular portion and conforms to the available space requirements within an appliance. Particular embodiments of the present invention include reservoirs, reservoir systems including a reservoir, processes for forming a reservoir, and processes for forming the aforementioned reservoir systems.

Improvements exhibited by providing a water reservoir formed of a length of reservoir tubing (i.e. a coil, a helix, etc.) include 1) Increased contact between the reservoir surface area and the liquid contents; 2) Separation between the cold liquid within the reservoir and incoming warmer liquid; 3) Utilizing and/or combining tubes and/or reservoirs of various dimensions and flexibility; 4) Increased volume for maintaining the liquid contents within the reservoir tubing when the reservoir tubing is formed with an inside diameter greater than the inside diameter of the inlet and/or outlet tubing; 5) Reduced turbulence in the flow of the liquid contents by decreasing the transitions between the reservoir and the fittings, inlet tubing and/or outlet tubing.

Respectively, the above improvements are achieved by embodiments of the present invention as follows: 1) A reservoir formed of reservoir tubing increases contact between the reservoir surface area and the liquid. Thereby, the amount of energy required to maintain or condition the temperature of the reservoir contents, via the surface area of the reservoir, is reduced. 2) By preventing the cold liquid within a reservoir from mixing with the incoming warm liquid, the temperature of the liquid within the length of reservoir tubing is maintained and the contents of the reservoir are more consistent. In other words and by example, the temperature of the reservoir liquid nearest the outlet is not displaced or diluted by the incoming warmer liquid. 3) A reservoir is adaptable to connect to fittings and/or tubes of various dimensions. By utilizing these dimensions of the fittings and/or the tubes, the flow of the liquid can be manipulated at the reservoir (i.e. venturi effect). Similarly, the reservoir may be adapted to connect to fittings and/or tubes formed of various materials and flexibility. 4) By providing reservoir tubing with an inside diameter greater than the inside diameter of the corresponding fittings, inlet and/or outlet tubing a reservoir formed of reservoir tubing holds an increased volume of liquid in comparison to distributing liquid to the source directly through the inlet and/or outlet tubing. 5) By forming a reservoir of reservoir tubing the turbulence in the flow of the liquid is reduced in comparison to a much larger bladder.

In one embodiment of the present invention, a reservoir comprises a reservoir tube. The reservoir tube has a first end a second end and a tube length wherein the first end is oriented opposite the second end along the tube length. One or more securing structures are provided to maintain the tube length of the reservoir tube in an overlapping circular portion. A first tube extension extends from the overlapping circular portion to the first tube end. A second tube extension extends from the overlapping circular portion to the second tube end. In some embodiments a first overmolded attachment piece is overmolded onto the first tube end and second overmolded attachment piece is overmolded onto the second tube end.

A reservoir system may be formed using an embodiment of a reservoir. An embodiment of the reservoir system comprises an inlet tube having an inlet fitting inserted into a bore of the overmolded attachment piece of the first end tube. The embodiment of the reservoir system may also comprise an outlet tube having an outlet fitting inserted into a bore of the overmolded attachment piece of the second tube end.

Embodiments of a process for forming a reservoir comprises a step of engaging a reservoir tube at an engagement point adjacent the first end of the reservoir tube. The process may include a step of driving the engagement point about a first circumference. A substantial first circle with at least a portion of the length of the reservoir tube may be formed by this step. In another step, tension may be applied to the length of the reservoir tube to force the length of the reservoir tube into a configuration about the first circumference. At least a portion of the length of the reservoir tube forms a substantial second circle adjacent the first circle. The steps of driving and applying tension may be repeated to form a first reservoir tube layer extending a width of the a reservoir. Another step includes returning at least a portion of the length of the reservoir tube and forming a second reservoir tube layer extending a second width of the reservoir using the same steps for forming the first reservoir tube layer but at a second circumference. The length of the reservoir tube forming the multiple reservoir tube layers into the overlapping circular portion may also be secured using one or more securing structures.

Embodiments for forming a reservoir system are also disclosed. Embodiments of the process for forming a reservoir system comprise an embodiment for forming a reservoir. The process may further include the step of inserting an inlet fitting into a bore of the overmolded attachment piece of the first tube end. Likewise, the process may also include inserting an outlet fitting into a bore of the overmolded attachment piece of the second tube end. Shape memory may be applied to the overmolded attachment piece of the first tube end to secure the inlet fitting to the overmolded attachment piece. Likewise, another step may include applying shape memory to the overmolded attachment piece of the second tube end to secure the outlet fitting to the overmolded attachment piece.

The foregoing and other objects, features and advantages of the invention will be apparent from the following more detailed descriptions of particular embodiments of the invention, as illustrated in the accompanying drawings wherein like reference numbers represent like parts of the invention.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Embodiments of the present invention include reservoirs, reservoir systems including a reservoir, processes for forming a reservoir, and processes for forming the aforementioned reservoir systems. Specifically, the present invention includes a reservoir made of tubing in an overlapping circular portion for reservoir systems.

Figure 1:
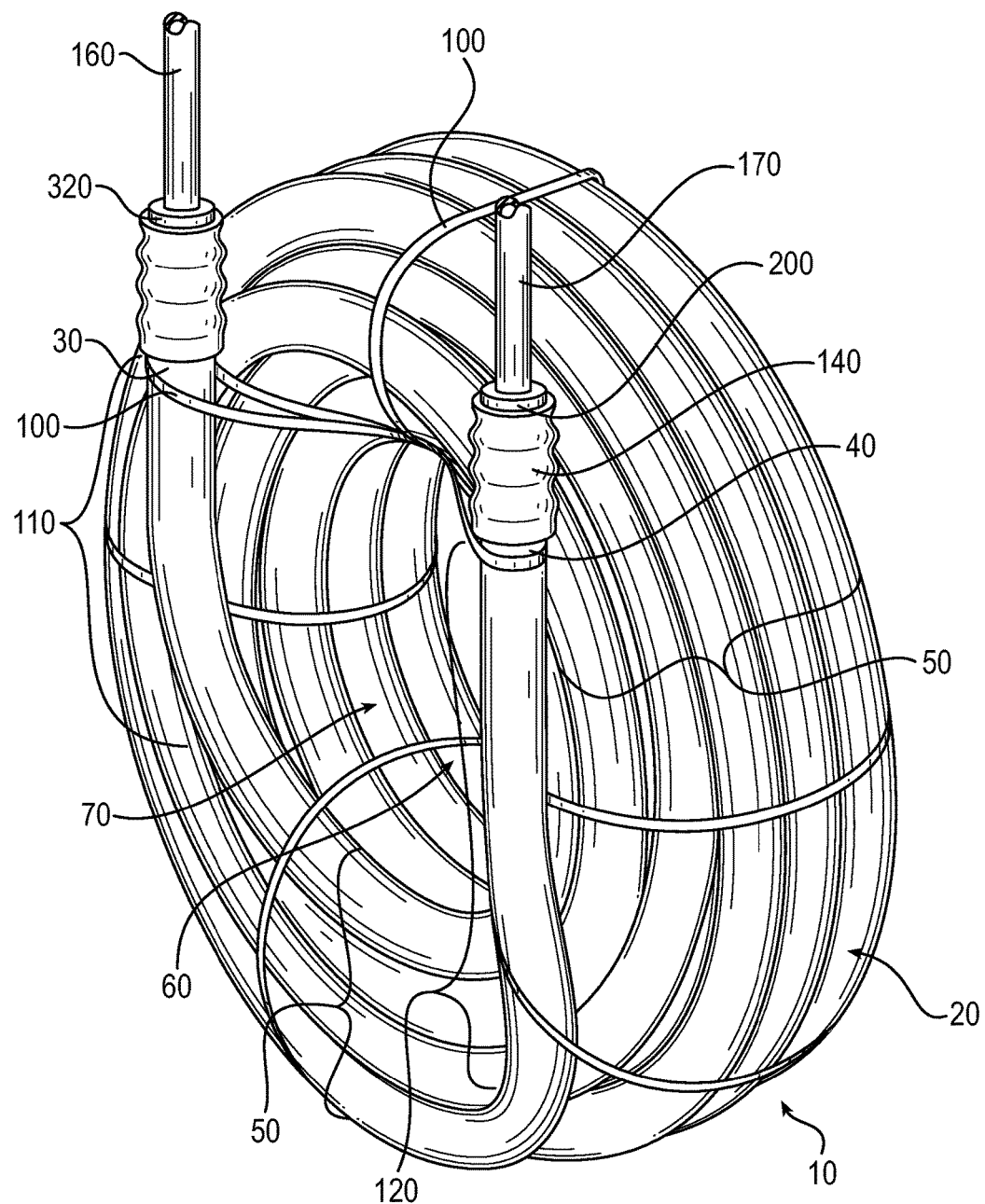
FIG. 1 is a perspective view of a reservoir, in accordance with an embodiment of the invention.
Figure 2:
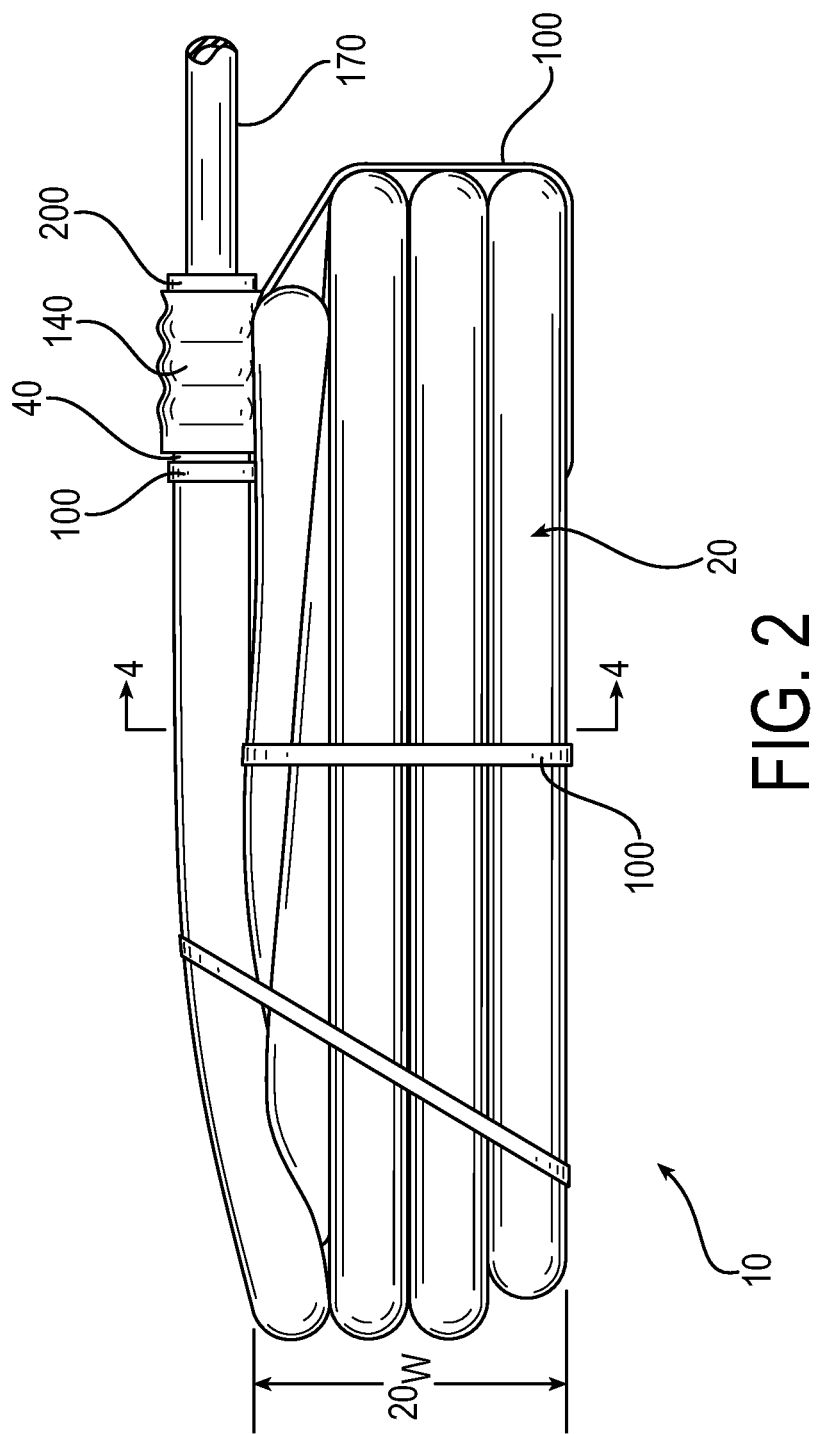
FIG. 2 is a side view of a reservoir, in accordance with an embodiment of the invention.
Figure 3:
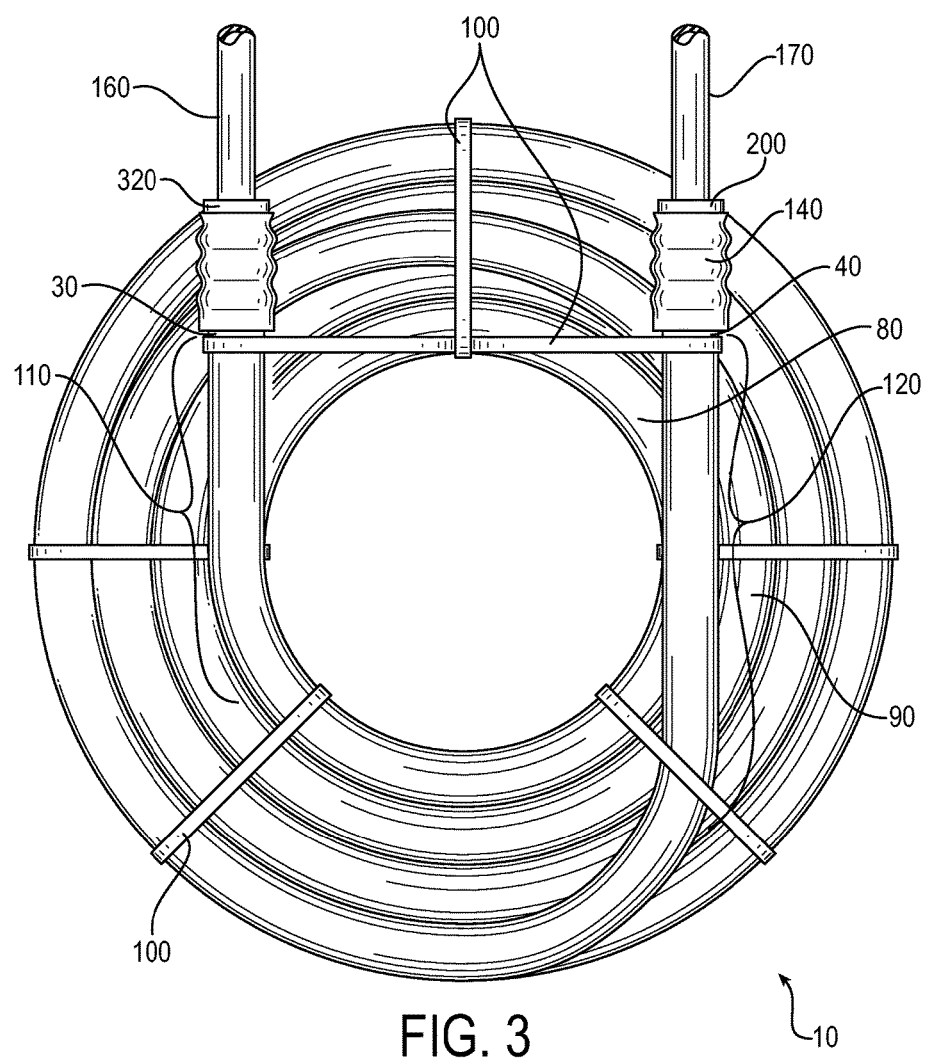
FIG. 3 is a top view of a reservoir, in accordance with an embodiment of the invention.

In particular embodiments of the present invention, processes for forming a reservoir include providing a reservoir tube. As illustrated by FIGS. 1-3, the reservoir tube 20 includes a first tube end 30, a second tube end 40 and a tube length. The first tube end 30 is located opposite the second tube end 40 along the tube length. Various embodiments of the present invention include forming a reservoir into a generally circular configuration. The circular configuration is described in great detail below. However, it is to be appreciated that the reservoir tube may take other shapes. By example, the reservoir tube may be overlapping in a configuration wherein the reservoir tube is straight along its length and returns at the ends of the length, thereby, forming a linear reservoir tube with multiple layers. Additionally and/or alternatively, any geometric configuration of a reservoir is contemplated by the present invention including, by example, a straight reservoir tube, etc.

In the processes for forming a reservoir, the reservoir tube is engaged or secured adjacent the first end. This engagement may be initiated by an individual and/or machine. The engagement may be as simple as gripping the reservoir tube at its exterior. A clamp may be used to engage the reservoir tube. Further, the tube may include notches or extrusions which form a point of engagement. The notches or extrusions may be a portion of an overmolded attachment piece which is attached to the first and/or second end of the reservoir tube. The overmolded attachment piece will be discussed in greater detail below.

The reservoir tube is driven or formed about a circumference. The circumference may be a circumferential path over which the reservoir tube is driven and the shape for which the reservoir tube is formed. Alternatively, the circumference may be controlled by a form structure about which the reservoir tube is driven. An example of a form structure may include a reel, a core, or the like. For discussion purposes herein, the reservoir tube is driven about the form structure and abuts the form structure. By abutting the reservoir tube to the form structure the reservoir tube is forced to take the shape of the form structure. In this example, the form structure has an outer diameter forming a circumference. The circumference of the form structure forces the length of the reservoir tube to form a circle about the circumference. In other words, by driving the reservoir tube around a circumference a substantial first circle is formed by at least a portion of the length of the reservoir tube. As illustrated by FIG. 1, an example of a substantial first circle 60 is the length of the reservoir tube forming a substantial circle. The substantial circle, however, does not terminate or return into itself at the first tube end 30. Thereby, a complete circle is not formed. Instead, when the length of the reservoir tube is adjacent the first tube end 30 the reservoir tube 20 begins forming a substantial second circle 70 adjacent the substantial first circle 60. By example, in this portion the length of the reservoir tube may begin forming a coil and/or a helix.

Tension may be applied to the length of the reservoir tube at the point the reservoir tube transitions from the substantial first circle to the substantial second circle during forming. This tension may be applied manually or mechanically. When a form structure is utilized, the tension maintains contact between the length of the reservoir tube and the form structure. This is in contrast to allowing the length of the reservoir tube to overlap the first substantial first circle at a circumferential path of greater dimension. Instead, the substantial first circle, substantial second circle and subsequent substantial circles, of a first reservoir tube layer, are formed about the same or similar circumferential path at adjacent positions on the form structure, thereby forming a helix. Please note, however, it is contemplated that other embodiments may allow the length of the reservoir tube to overlap each respective substantial circles at circumferential paths of greater dimension, thereby forming a coil. In particular, this alternative configuration may occur in instances each reservoir tube layer is formed of only a single substantial circle. However, it is contemplated and appreciated that the overlapping circular portion of a reservoir may be a combination of a coil and a helix or a variation of each and/or both.

The steps of driving the length of the reservoir tube and applying tension to the length of the reservoir tube are repeated until a first reservoir tube layer 80 is formed, as illustrated by FIG. 3. In some embodiments, the first reservoir tube layer may be formed by a substantial first and second circle. In other embodiments, the first reservoir tube layer may be formed by more than two substantial circles.

Figure 4:
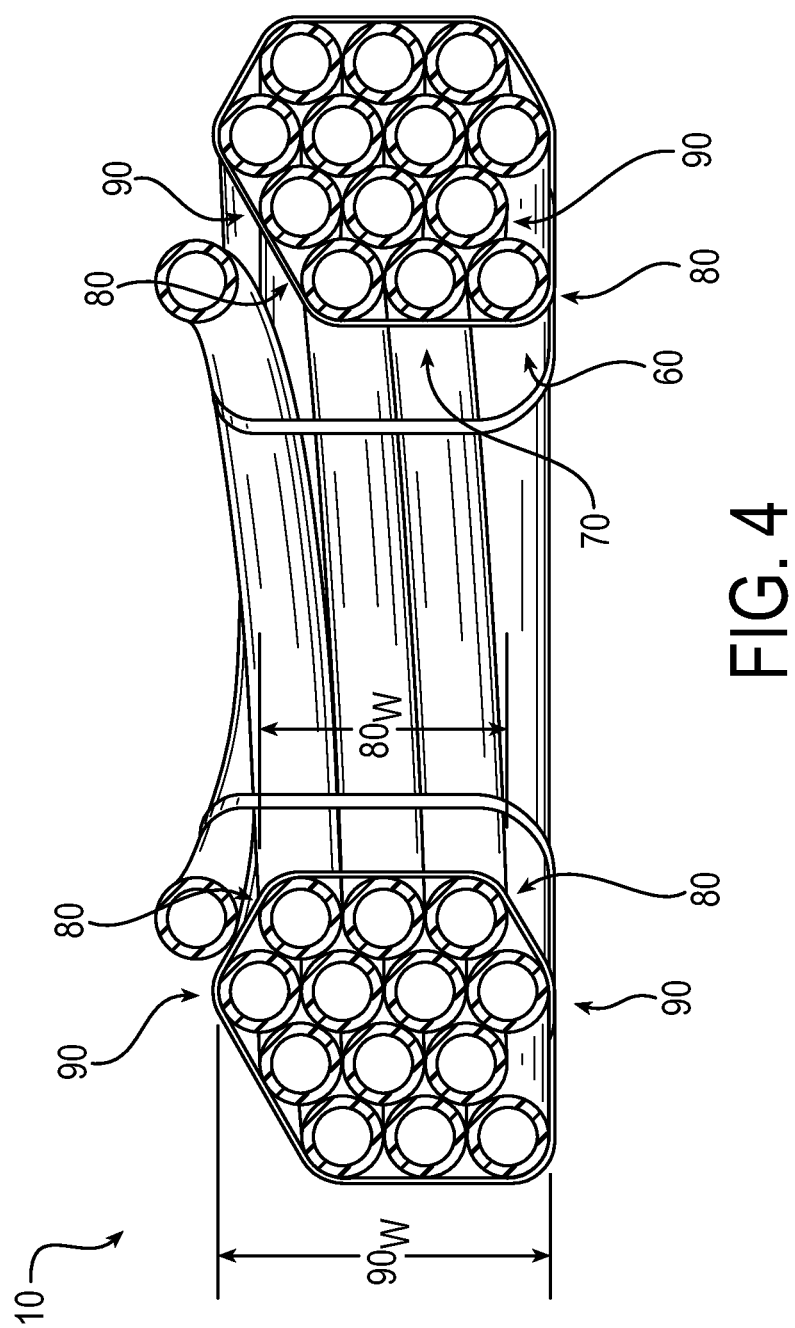
FIG. 4 is a cross-sectional view of the reservoir, in accordance with an embodiment of the invention.

Turning to FIGS. 2-3, a reservoir tube layer, formed by multiple substantial circles about a circumferential path, forms a width $20_W$ of the reservoir. A reservoir may comprise multiple widths, each width formed at each respective reservoir tube layer. By example and as illustrated by FIG. 4, a first width $80_W$ of the reservoir may be formed at the first reservoir tube layer 80. The second reservoir tube layer 90 may have a second width $90_W$ of the reservoir, or in other words, the reservoir may comprise multiple or variable widths. FIGS. 3-4 illustrate a second reservoir tube layer 90 may be formed adjacent the first reservoir tube layer 80. The second reservoir tube layer 90 being formed in the same manner as the first reservoir tube layer 80. It is also appreciated that in some embodiments, the first, second and subsequent reservoir tube layers may have the same width.

FIG. 4 illustrates a cross-section of an embodiment. In particular, FIG. 4 illustrates the first reservoir tube layer 80, the second reservoir tube layer 90, and subsequent reservoir tube layers. Each reservoir tube layer is formed by multiple substantial circles (i.e. the substantial first circle 60, the substantial second circle 70, etc.) of the reservoir 10. The multiple substantial circles within each reservoir tube layer form the width $20_W$, as previously illustrated in FIG. 2. In this embodiment, each reservoir tube layer comprises different reservoir tube widths (for example, $80_W$, $90_W$, etc.).

The length of the reservoir tube transitions from the first reservoir tube layer 80 to the second reservoir tube layer 90 when the length of the reservoir tube is driven or forced over the first reservoir tube layer 80. Thereby, the second reservoir tube layer 90 is formed about a circumference which is greater than the circumference of the first reservoir tube layer 80. Tension may, again, be applied to the length of the reservoir tube at this transition in order to force and/or guide the length of the reservoir tube back over top the first reservoir tube layer 80. In addition to tension, a change of direction may be applied to force the second reservoir tube layer (or any subsequent reservoir tube layer) over the previous reservoir tube layer. This process may be repeated on subsequent reservoir tube layers. The subsequent reservoir tube layers additionally have a respective width of the reservoir and are formed at increasing circumferences.

In some embodiments, a subsequent reservoir tube layer may be formed directly over top of the previous reservoir tube layer. In other embodiments, a subsequent reservoir tube layer may be positioned within the recesses or voids formed between each length of the reservoir tube forming the previous reservoir tube layer. In yet other embodiments, a subsequent reservoir tube layer may be formed of a combination of the above. In various embodiments, the length of the reservoir tube may also be intertwined between multiple reservoir tube layers. Although various embodiments provide symmetry between the multiple tube layers and/or the substantial circles, the multiple tube layers and/or the substantial circles may be asymmetrical in some embodiments.

Upon forming the tube layers at the desired circumferences and widths, the length of the reservoir tube is secured into a formation. Generally, the formation may be an overlapping circular portion. Such configurations may include a coil, a helix or the like. As discussed above, a coil is formed by multiple tube layers with increasing circumferential dimensions. In contrast, a helix is formed within a tube layer having multiple substantial circles having the same or similar circumferential dimensions. As illustrated by FIGS. 1-3, the tube layers and/or multiple substantial circles may be secured to one another by using one or more securing structures 100. The securing structures may be straps, mechanical clamping structures, glue, braces, or the like. For illustrative purposes, the securing structure will be described as straps. The straps may be any straps which wrap around multiple sections of the length of the reservoir tube. In one embodiment, straps may wrap around all of the reservoir tube layers, including all of the multiple substantial circles formed within each reservoir tube layer. In other embodiments, a strap may only secure a portion of the reservoir tube layers and/or only a portion of the multiple substantial circles. Examples of straps include zip ties, cable ties, rubber bands, tape, wire, string, a combination thereof, or the like. The straps maintain the length of reservoir tube in the overlapping circular portion and may be positioned at any point about at least a portion of the overlapping circular portion.

FIGS. 1 and 3 illustrate the first tube end 30 and second tube end 40 extend from an overlapping circular portion 50 of the reservoir tube 20. The first tube end 30 may extend from the overlapping circular portion in the same direction, opposite the direction, or in any variation of directions in relation to the direction the second tube end extends from the overlapping circular portion. Similarly, the first tube end and/or second tube end may extend from the shortest circumference, an intermediate circumference, or the largest circumference of any reservoir tube layer. Likewise, the first tube end and/or second end may extend from any respective reservoir tube layer. The extension of the first tube end 30 and/or second tube end 40 of the reservoir tube 20 may form a first tube extension 110 and a second tube extension 120, respectively. The first tube extension 110 and the second tube extension 120 extend from the overlapping circular portion to a desired location to receive fittings at tubing within an appliance, such as an inlet tube or an outlet tube, respectively. The first tube extension and the second tube extension may be orientated with respect to each other based upon the particular use of the reservoir. By example, fittings for connecting to the reservoir may have various locations within an appliance and the first tube extension and second tube extension of the tube reservoir may be orientated in a corresponding relationship. In one particular embodiment, the first tube extension 110 and the second tube extension 120 are substantially parallel.

As illustrated in FIGS. 1-3 and 5, an overmolded attachment piece 140 may be overmolded to the first tube end 30 and/or second tube end 40 of the reservoir tube 20. In one particular embodiment, the overmolded attachment piece is overmolded onto the first tube end and/or the second tube end before forming the overlapping circular portion of the reservoir. The overmolded attachment piece forms a leak-proof connection to the tube. In particular, the melt fusion, blending or alloying, as described further below, forms a seal between the overmolded attachment piece and the tube. By example, the overmolded attachment piece and the tube become miscible. In various embodiments, the overmolded attachment piece may be overmolded onto the first tube end and/or second tube end after forming the overlapping circular portion of the reservoir. Yet, in other embodiments, the overmolded attachment piece may be overmolded onto the first tube end and/or second tube end as an intermediate process. Overmolding occurs before crosslinking the portion of the reservoir being overmolded. Overmolding and crosslinking are discussed in greater detail below. When overmolding occurs before forming the reservoir, the length of the reservoir tube is pre-calculated and pre-cut. Alternatively, overmolding may occur after the reservoir has been formed. Thereby the reservoir may be formed using an oversized length of the reservoir tubing. By example, the overmolded attachment pieces may be attached after the reservoir is formed and the length of the reservoir tube is cut to length. Even when overmolding occurs after the reservoir is formed, the length of the reservoir tube may be pre-calculated and pre-cut. Likewise, overmolding one end of the reservoir tubing or another, in advance of forming the reservoir, is not exclusive to pre-calculating and pre-cutting the length of the reservoir tube.

In various embodiments and as illustrated in FIGS. 1-3, the first tube extension 110 and the second tube extension 120 of the reservoir tube 20 are fastened or secured in relation to one another and/or to the overlapping circular portion of the reservoir 10. Securing structures 100 may be used to fasten or secure the first tube extension 110 in relation to the second tube extension 120. By example, a securing structure 100 such as strapping may extend around the diameter of the reservoir tube of the first tube extension and also extend around the diameter of the reservoir tube of the second tube extension. Since the circular shape of the overlapping circular portion may naturally force the first end in a direction opposite the second end (in an original straight configuration) the strapping placed at the first tube extension and the second tube extension forces the first tube extension and the second tube extension toward one another and into a desired position. As mentioned above, in one particular embodiment the desired position may place the first tube extension substantially parallel to the second tube extension. Similarly, the first end and the second end may naturally separate or extend from the overlapping circular portion of the reservoir. Thereby, the first tube extension 110 and the second tube extension 120 may additionally be secured to the overlapping circular portion. This may also be accomplished by securing structures 100. Again, by example, strapping may be provided about the length of the reservoir tube at the first tube extension and the second tube extension and extend around, under or through a portion of the overlapping circular portion and secure the first end and/or second end in relation to the overlapping circular portion. Additionally or alternatively, the strapping may extend around, under or through strapping already provided at the overlapping circular portion. In one embodiment, the strapping 100 securing the first tube extension 110 and the second tube extension 120 of the reservoir tube 20 additionally extends around, under or through the strapping 100 provided at the overlapping circular portion. One particular embodiment uses a single length of strapping 100 to secure the first tube extension 110 in relation to the second tube extension 120 and to additionally secure the first tube extension 110 and second tube extension 120 to the overlapping circular portion.

In some embodiments, the reservoir is part of a reservoir system. The reservoir system may be installed or secured within an appliance (i.e. refrigerator). Additionally or alternatively, the reservoir may be secured to the fitting connections, such as an inlet tube and/or an outlet tube.

Figure 6:
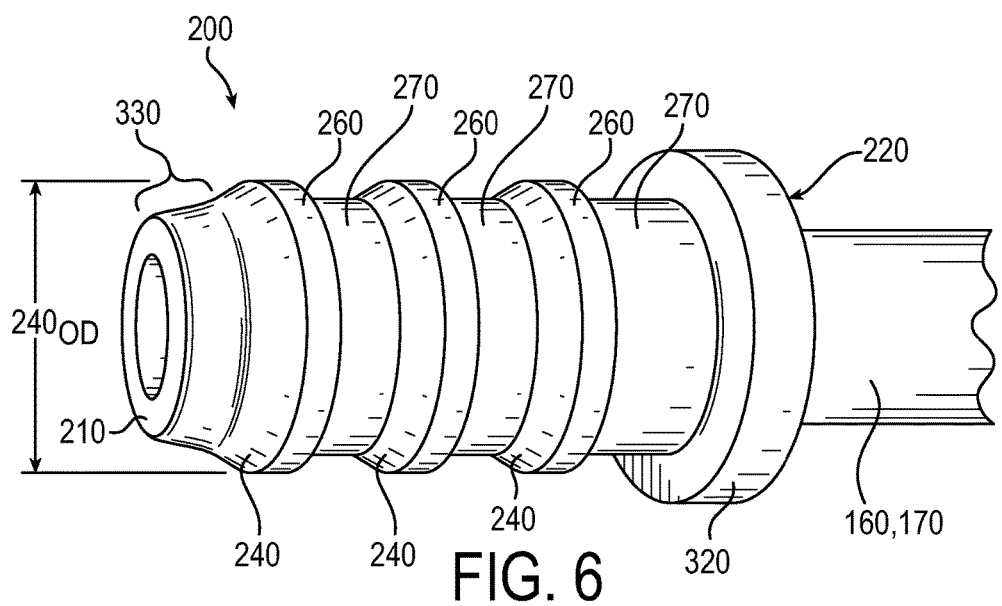
FIG. 6 is a perspective view of a leak-proof connection fitting, in accordance with an embodiment of the invention.

The method for forming a reservoir system includes inserting a leak-proof connection fitting 200 into a bore of the overmolded attachment piece 140. The overmolded attachment piece may be overmolded on the first tube end and/or the second tube end of the length of the reservoir tube. The leak-proof connection fitting may be attached to or formed on an inlet tube. In various embodiments, the fitting may be formed as a part of the inlet tube, attached to the inlet tube via an overmolded attachment piece, inserted to an overmolded attachment piece at the inlet tube, inserted directly into the inlet tube, or the like. In some embodiments, as shown in FIG. 6 for example, the leak-proof connection fitting 200 is overmolded onto the inlet and/or the outlet tubing 160, 170 and forms a material-to-material bond. The leak-proof connection fitting forms a seal at the tubing. In particular, the melt fusion, blending or alloying, as described further below, forms a seal between the overmolded leak-proof connection fitting and the tubing. By example, the overmolded attachment piece and the tubing become miscible. In other embodiments, the leak-proof connection fitting may be attached to the inlet or outlet tubing by any connection known in the art. The inlet tube may be a part of the appliance, an external unit, and/or a water supply. Similarly, the method for forming a reservoir system may include inserting a leak-proof connection fitting into a bore of the overmolded attachment piece overmolded on the second end of the length of the reservoir tube. The leak-proof connection fitting at the second end of the length of the reservoir tube may be attached to or formed on an outlet tube. The leak-proof connection fitting at the outlet tube may be formed in the same manner as the fitting at the inlet tube or in an alternative manner, as described in relation to the inlet tube.

In one particular embodiment and as illustrated by FIGS. 1-3, the first tube end 30 of the reservoir tube 20, for attachment to the inlet tube 160, extends from the innermost reservoir tube layer (i.e. first reservoir tube layer) of the overlapping circular portion. The second tube end 40 of the reservoir tube 20, for attachment to the outlet tube 170, extends from the outermost reservoir tube layer of the overlapping circular portion. In some embodiments, each end of the reservoir tube may be positioned to the same side of the width of the overlapping circular portion or to opposite sides of the width overlapping circular portion.

Figure 8:
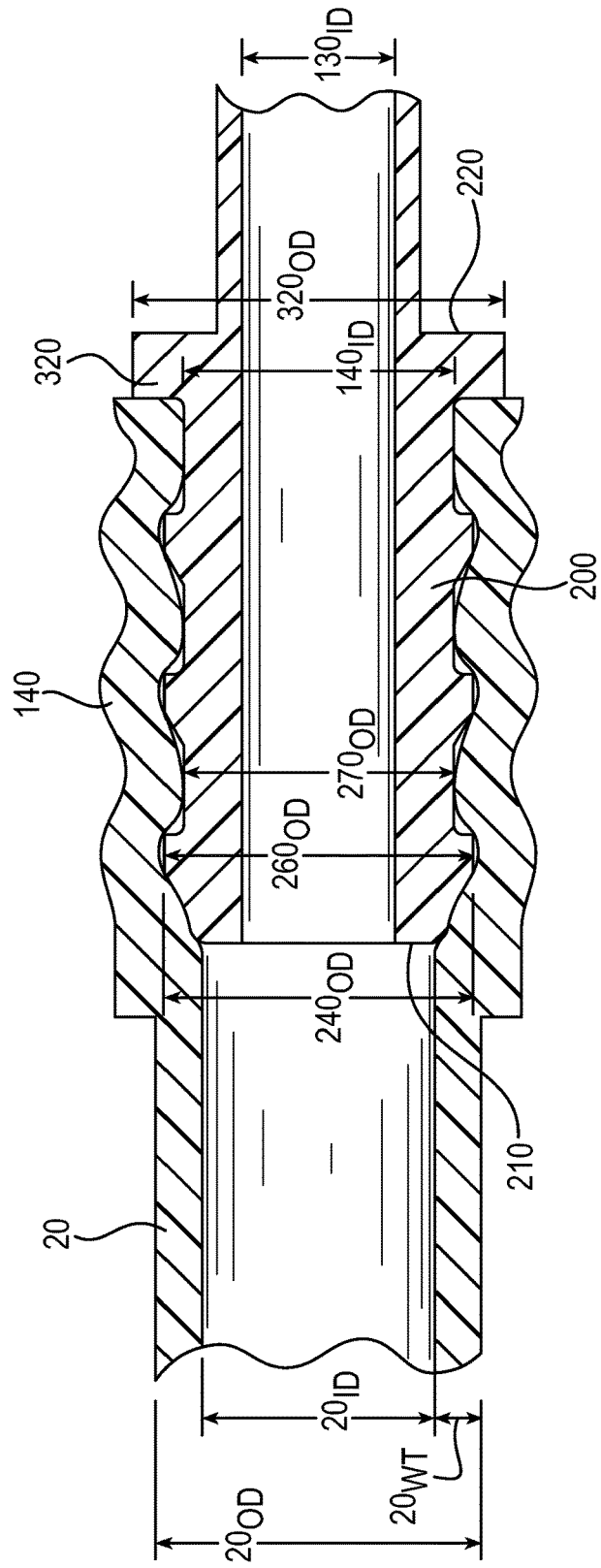
FIG. 8 is a side cross sectional view of a leak-proof connection fitting inserted into an overmolded attachment piece, in accordance with an embodiment of the invention.

In various embodiments and as illustrated in FIG. 8, the inside diameter $20_{ID}$ of the length of reservoir tube is greater than the inside diameter $130_{ID}$ of the fitting connections and/or corresponding tubing (i.e. inlet fitting/tubing and/or outlet fitting/tubing). This provides greater fluid flow through the reservoir tubing while still limiting the transition between the reservoir tubing and the inlet/outlet fittings, comparatively to a bladder reservoir. Further, a larger volume of water is capable of being stored and cooled in a shorter length of reservoir tubing in comparison to reservoir tubing having the same inside diameter as the fitting connections and corresponding tubing. The primary advantage of this feature is the reduction of surface friction which provides for much less back pressure as water flows through the reservoir. This results in greater water flow through a reservoir of comparable volume but which utilizes smaller area than a bladder. The larger tube diameter also provides a more accurate means to properly size the tube wall thickness, allowing for less material to achieve a target burst pressure. In one embodiment, a burst pressure of 700 PSI (pounds per square inch) is provided. The tube wall thickness is discussed and illustrated in greater detail below. In some embodiments, the inside diameter of the reservoir tube may be less than the inside diameter of the fitting connections and/or corresponding tubing.

In various embodiments and still referring to FIG. 8, the outside diameter $20_{OD}$ of the length of reservoir tube may be relative to the inside diameter $20_{ID}$ of the length of the reservoir tube. By example, the wall thickness $20_{WT}$ of the length of the reservoir tube, which is a product of the inside diameter and outside diameter, impacts the energy transfer through the tube, flexibility of the tube, and/or resiliency of the tube. In some embodiments a thinner walled tube is provided to increase the availability of energy transfer, thereby allowing the contents of the tubing to be heated or cooled by the temperature of the tube or energy transferred through the tube. In contrast, a thicker walled tube is provided to insulate the contents of the tube, thereby preventing energy transfer through the tube. In variations of these embodiments, the thinner walled tube is provided to provide a more flexible tube for forming tighter or smaller configurations of the tube. Further, more flexible tubes reduce the side load exhibited at fittings, for example, fittings at inlet tubes and/or outlet tubes. In yet other variations of these embodiments, a thicker walled tube is provided to strengthen the tube to prevent kinks when forming various configurations of the tube and/or to increase the resiliency of the tube. In particular embodiments of the present invention, the outside diameter for the length of reservoir tube is greater than or equal to 0.300 inches. In one particular embodiment of the present invention, the outside diameter of the reservoir tube is 0.5 inches.

Figure 5:
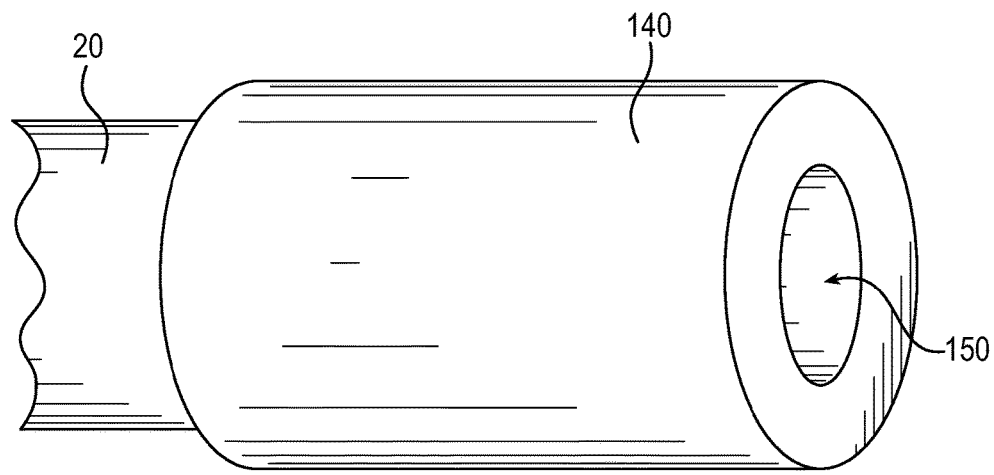
FIG. 5 is a perspective view of an overmolded attachment piece, in accordance with an embodiment of the invention.

As illustrated by FIG. 6, a leak-proof connection fitting 200 has a first fitting end 210 which is inserted into the bore 150 of the overmolded attachment piece 140 (as illustrated in FIG. 5). More generally, the fitting 200 includes a first fitting end 210 and a second fitting end 220, the second fitting end 220 is positioned opposite the first fitting end 210. In this particular embodiment, the fitting includes ramp portions 240, multiple raised surfaces 260 and multiple reduced surfaces 270. The ramp potions 240 and/or raised surfaces 260 are separated from the adjacent ramp portion 240 and/or raised surface 260 by a reduced surface 270. Further, a ramp portion 240 and/or raised surface 260 is also separated from a flange 320 by a reduced surface 270, the flange 320 positioned at the second fitting end 220. In the embodiment as illustrated by FIG. 6, the leak-proof connection fitting also includes a tapered engaging surface 330. The tapered engaging surface 330 assists with positioning the fitting 200 within the bore of the overmolded attachment piece. The tapered engaging surface 330 may also assist with expanding the bore of the overmolding attachment piece when making the connection.

Figure 9:
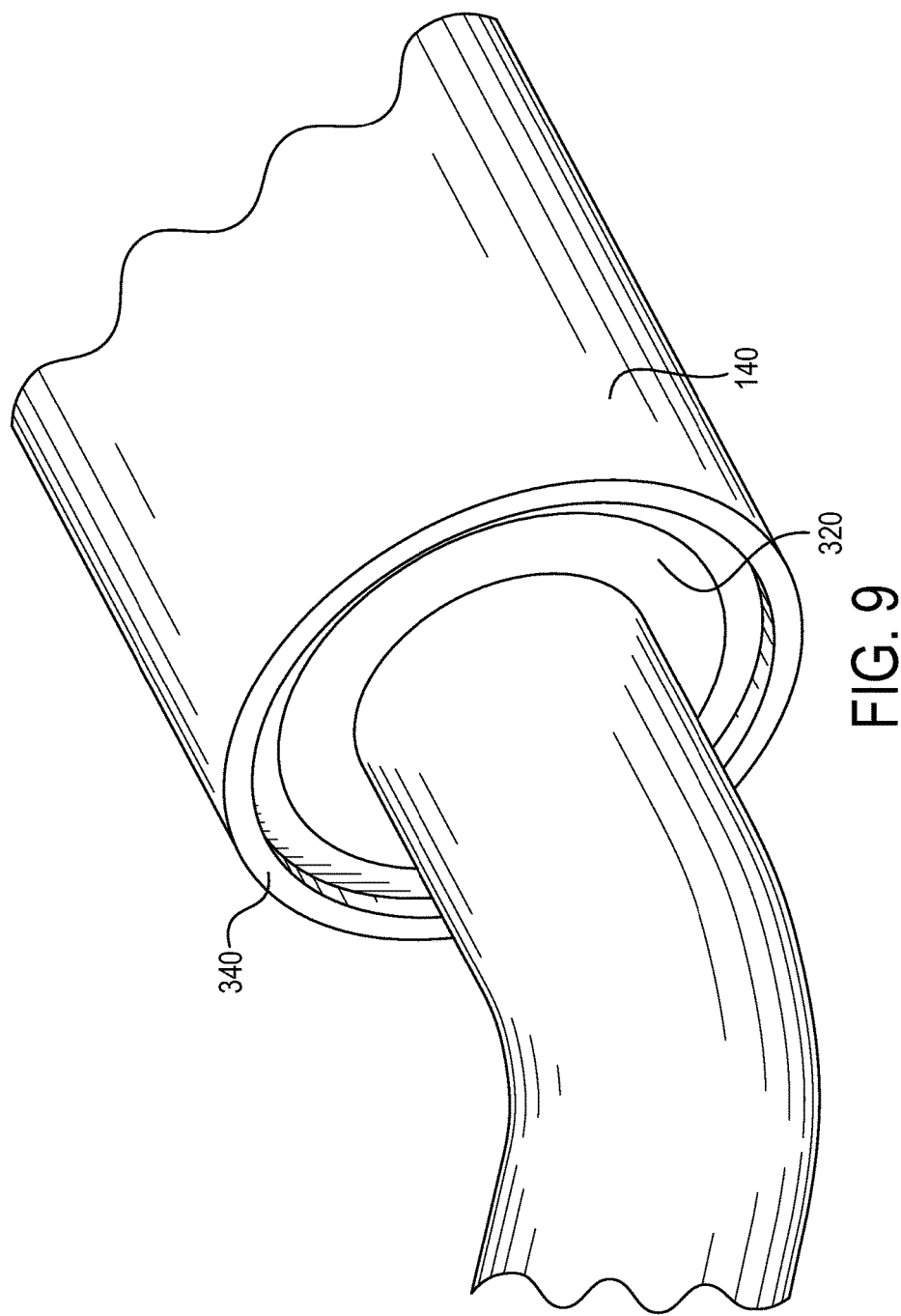
FIG. 9 is a perspective view of a leak-proof connection fitting inserted into an overmolded attachment piece having a lip, in accordance with an embodiment of the invention.

In some embodiments and as illustrated by FIG. 9, the overmolded attachment piece 140 has a lip 340. The lip is formed on the overmolded attachment piece 140 and may extend over and about the perimeter of the flange 320 when a first fitting end 210 and/or a second fitting end 220 are inserted into the overmolded attachment piece 140. The lip may be integrally formed in the overmolded attachment piece 140 and extend from the overmolded attachment piece 140. In some embodiments, the lip 340 may be formed independent of the overmolded attachment piece 140. The lip 340 may conceal and protect the fitting and/or the flange 320 when inserted into the overmolded attachment piece 140. The lip 340 may also provide a flush surface in combination with the flange 320. In some embodiments the lip 340 serves to protect the flange 320 from catching on other components and separating from the overmolded attachment piece 140 and/or prevent tampering with the connection between the overmolded attachment piece 140 and the fitting. It is also appreciated the lip may be used in combination with fittings that do not have flanges.

Embodiments of the present invention may also include fittings having various combinations of one or more barbs, one or more raised surfaces, one or more reduced surfaces, one or more O-rings, one or more pliable surfaces, one or more contours, one or more ribs, and the like, between the first fitting end and the second fitting end. By example, in some embodiments, the fitting includes a barb proximal the first fitting end. The barb has a barb outside diameter. The barb is designed with one or more sharp edges to provide retention to the overmolded attachment piece of the reservoir tube, once it is installed. Embodiments may also include a first raised surface distal the first fitting end. The first raised surface may include a first raised surface outside diameter. The first raised surface forms a smooth straight section. The smooth straight section prevents long term creep by providing additional surface area for retention and a seal for when the sharp edges of the barb deform or become rounded by the force exerted at the connection. A second raised surface may also be provided, distal the first end. The second raised surface includes a second raised surface outside diameter. Similar to the first raised surface, the second raised surface may form a smooth straight section. Separating the barb from the first raised surface along a longitudinal length of the fitting may be a first reduced surface. The first reduced surface has a first reduced surface outside diameter wherein the first reduced surface outside diameter is less than the first raised surface outside diameter. Separating the first raised surface from the second raised surface along a longitudinal length of the fitting may be a second reduced surface. The second reduced surface has a second reduced surface outside diameter wherein the second reduced surface outside diameter is less than the first raised surface outside diameter and the second raised surface outside diameter.

Figure 7:
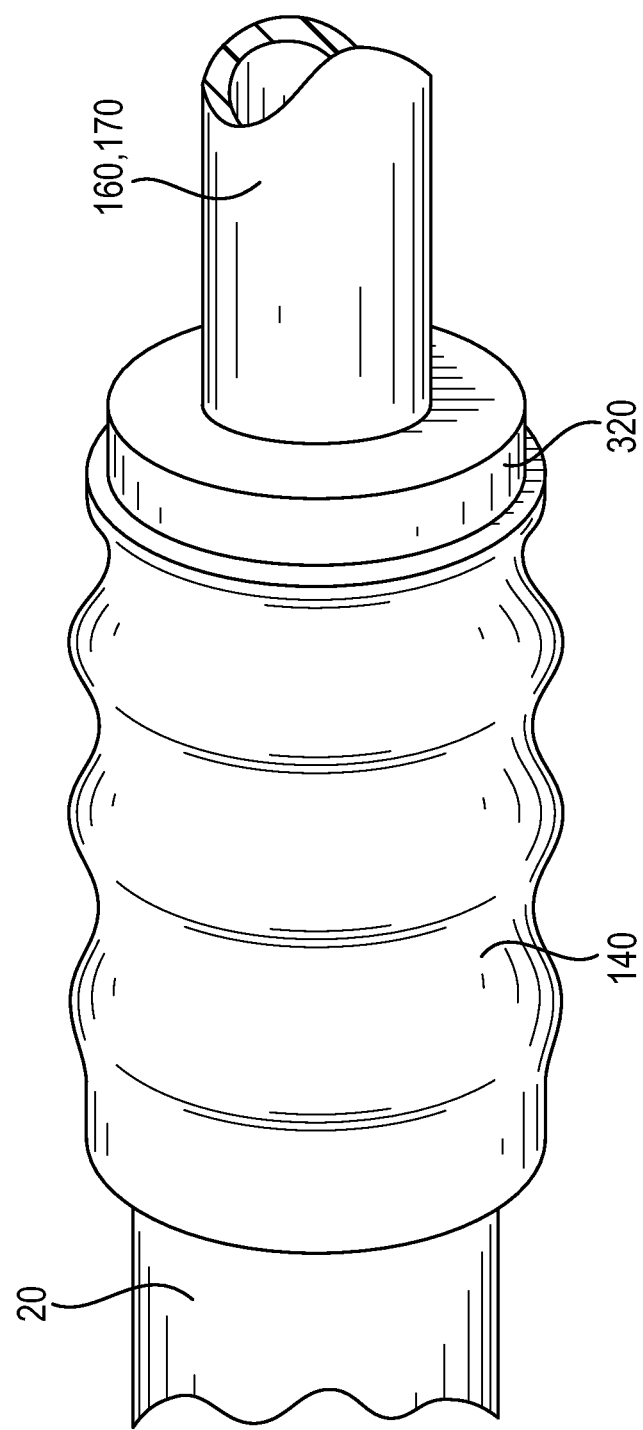
FIG. 7 is a perspective view of a leak-proof connection fitting inserted into an overmolded attachment piece, in accordance with an embodiment of the invention.

In various embodiments of the present invention and as illustrated by FIGS. 7-8, the overmolded attachment piece is secured to the fitting by shape memory. Shape memory materials have the ability to return from a deformed state (e.g. temporary shape) to their original crosslinked shape (e.g. permanent shape), typically induced by an external stimulus or trigger, such as a temperature change. Alternatively or in addition to temperature, shape memory effects can be triggered by an electric field, magnetic field, light, or a change in pH, or even the passage of time. Shape memory polymers include thermoplastic and thermoset (covalently crosslinked) polymeric materials. Shape memory and shape memory materials are discussed in greater detail, below.

In particular embodiments, the process for assembly of the apparatus may include expanding the bore of the overmolded attachment piece using a pin or mandrel and pushing the expanded overmolded attachment piece over the various features of the fitting, i.e. barbs, upon removing the pin or mandrel. The assembly of the overmolded attachment piece onto the fitting could be performed manually using this process and may require very little force. In another embodiment, mechanical force may be used to push the unexpanded overmolded attachment piece over the barb. A sensor may be used to detect and ensure full and proper engagement between the overmolded attachment piece and the barb. Additionally or alternatively and as illustrated in FIGS. 6-8, a flange 320 may be positioned on the fitting 200 and/or the tubing 160, 170. In one embodiment, the flange 320 is positioned on the fitting 200 to designate a position of full engagement. By example, the fitting may be inserted into the overmolded attachment piece 140 until the flange 320 contacts or is adjacent to the overmolded attachment piece 140. Marking may additionally or alternatively be provided on the fitting to identify the desired depth the fitting is to be inserted into the overmolded attachment piece of the reservoir tube.

In particular embodiments and as discussed above, the leak proof connection fitting of an inlet tube and/or an outlet tube includes multiple barbs. Multiple barbs and/or retention features increase the resistance to separation at a connection and, in particular, when the connection includes tubes of increased diameter. As previously discussed and as illustrated by FIGS. 6 and 8, The fitting 200 may include a tapered engaging surface 330 and/or a ramp portion 240 having an outside diameter $240_{OD}$ for guiding the overmolded attachment piece over the fitting 200. The tapered engaging surface 330 may be provided in combination with or independent of the ramp portion 240. The tapered engaging surface 330 and the ramp portion 240 may be provided at barbs and/or raised surfaces 260. In these embodiments and as illustrated by FIGS. 6 and 8, each raised surface 260 is separated by a reduced surface 270 and includes a ramp portion 240. In one particular embodiment, the raised surfaces have an outside diameter $260_{OD}$ of 0.510 inches and the reduced surfaces have an inside diameter $270_{OD}$ of 0.445 inches. This particular embodiment also includes a flange 320. The outside diameter $320_{OD}$ of the flange 320 is 0.575 inches. In this embodiment, the bore forms an inside diameter $140_{ID}$ of the overmolded attachment piece of less than 0.575 inches, thereby the flange 320 acts as a stop upon contacting a surface of the overmolded attachment piece 140.

As used in this application, the term "overmold" means the process of injection molding a second polymer over a first polymer, wherein the first and second polymers may or may not be the same. In one embodiment of the invention, the composition of the overmolded polymer will be such that it will be capable of at least some melt fusion with the composition of the polymeric tube. There are several means by which this may be affected. One of the simplest procedures is to insure that at least a component of the polymeric tube and that of the overmolded polymer is the same. Alternatively, it would be possible to insure that at least a portion of the polymer composition of the polymeric tube and that of the overmolded polymer is sufficiently similar or compatible so as to permit the melt fusion or blending or alloying to occur at least in the interfacial region between the exterior of the polymeric tube and the interior region of the overmolded polymer. Another manner in which to state this would be to indicate that at least a portion of the polymer compositions of the polymeric tube and the overmolded polymer are miscible. In contrast, the chemical composition of the polymers may be relatively incompatible, thereby not resulting in a material-to-material bond after the injection overmolding process.

In one embodiment of this invention, polymeric tubing is made from high density polyethylene which is crosslinked. PEX contains crosslinked bonds in the polymer structure changing the thermoplastic into a thermoset. Crosslinking may be accomplished during or after the molding of the part. The required degree of crosslinking for crosslinking polyethylene tubing, according to ASTM Standard F 876-93, is between 65-89%. There are three classifications of PEX, referred to as PEX-A, PEX-B, and PEX-C. PEX-A is made by peroxide (Engel) method. In the PEX-A method, peroxide blending with the polymer performs crosslinking above the crystal melting temperature. The polymer is typically kept at high temperature and pressure for long periods of time during the extrusion process. PEX-B is formed by the silane method, also referred to as the "moisture cure" method. In the PEX-B method, silane blended with the polymer induces crosslinking during molding and during secondary post-extrusion processes, producing crosslinks between a crosslinking agent. The process is accelerated with heat and moisture. The crosslinked bonds are formed through silanol condensation between two grafted vinyltrimethoxysilane units. PEX-C is produced by application of an electron beam using high energy electrons to split the carbon-hydrogen bonds and facilitate crosslinking.

Crosslinking imparts shape memory properties to polymers. Shape memory materials have the ability to return from a deformed state (e.g. temporary shape) to their original crosslinked shape (e.g. permanent shape), typically induced by an external stimulus or trigger, such as a temperature change. Alternatively or in addition to temperature, shape memory effects can be triggered by an electric field, magnetic field, light, or a change in pH, or even the passage of time. Shape memory polymers include thermoplastic and thermoset (covalently crosslinked) polymeric materials.

Shape memory materials are stimuli-responsive materials. They have the capability of changing their shape upon application of an external stimulus. A change in shape caused by a change in temperature is typically called a thermally induced shape memory effect. The procedure for using shape memory typically involves conventionally processing a polymer to receive its permanent shape, such as by molding the polymer in a desired shape and crosslinking the polymer defining its permanent crosslinked shape. Afterward, the polymer is deformed and the intended temporary shape is fixed. This process is often called programming. The programming process may consist of heating the sample, deforming, and cooling the sample, or drawing the sample at a low temperature. The permanent crosslinked shape is now stored while the sample shows the temporary shape. Heating the shape memory polymer above a transition temperature $T_{trans}$ induces the shape memory effect providing internal forces urging the crosslinked polymer toward its permanent or crosslinked shape. Alternatively or in addition to the application of an external stimulus, it is possible to apply an internal stimulus (e.g., the passage of time) to achieve a similar, if not identical result.

A chemical crosslinked network may be formed by low doses of irradiation. Polyethylene chains are oriented upon the application of mechanical stress above the melting temperature of polyethylene crystallites, which can be in the range between 60° C. and 13° C. Materials that are most often used for the production of shape memory linear polymers by ionizing radiation include high density polyethylene, low density polyethylene and copolymers of polyethylene and poly(vinyl acetate). After shaping, for example, by extrusion or compression molding, the polymer is covalently crosslinked by means of ionizing radiation, for example, by highly accelerated electrons. The energy and dose of the radiation are adjusted to the geometry of the sample to reach a sufficiently high degree of crosslinking, and hence sufficient fixation of the permanent shape.

Another example of chemical crosslinking includes heating poly(vinyl chloride) under a vacuum resulting in the elimination of hydrogen chloride in a thermal dehydrocholorination reaction. The material can be subsequently crosslinked in an HCl atmosphere. The polymer network obtained shows a shape memory effect. Yet another example is crosslinked poly[ethylene-co-(vinyl acetate)] produced by treating the radical initiator dicumyl peroxide with linear poly[ethylene-co-(vinyl acetate)] in a thermally induced crosslinking process. Materials with different degrees of crosslinking are obtained depending on the initiator concentration, the crosslinking temperature and the curing time. Covalently crosslinked copolymers made form stearyl acrylate, methacrylate, and N,N'-methylenebisacrylamide as a crosslinker.

Additionally shape memory polymers include polyurethanes, polyurethanes with ionic or mesogenic components, block copolymers consisting of polyethyleneterephthalate and polyethyleneoxide, block copolymers containing polystyrene and poly(1,4-butadiene), and an ABA triblock copolymer made from polly(2-methyl-2-oxazoline) and a poly (tetrahydrofuran). Further examples include block copolymers made of polyethylene terephthalate and polyethylene oxide, block copolymers made of polystyrene and poly(1,4-butadiene) as well as ABA triblock copolymers made from poly(tetrahydrofuran) and poly(2-methyl-2-oxazoline). Other thermoplastic polymers which exhibit shape memory characteristics include polynorbornene, and polyethylene grated with nylon-6 that has been produced for example, in a reactive blending process of polyethylene with nylon-6 by adding maleic anhydride and dicumyl peroxide.

In processing, several steps may be taken to secure the fitting to an extruded polymeric tube. The overmolded attachment piece having a bore may be overmolded on a tube at or adjacent one end of the tube. The first end of the fitting, as disclosed in the various embodiments above, may be inserted into the bore of the overmolded attachment piece. The fitting may be inserted into the overmolded attachment piece entirely, from the first end of the fitting to the second end of the fitting, or alternatively, may be inserted partially into the overmolded attachment piece. Alternatively, the fitting may be inserted directly into the extruded polymeric tube. The overmolded attachment piece or extruded polymeric tube may be secured to the fitting by shape memory. The step of securing may additionally or alternatively include biasing the bore with one or more barbs and/or one or more raised surfaces. In yet another embodiment, the process for securing the fitting to an extruded polymeric tube may include the step of extending or sliding the overmolded attachment piece over an O-ring that may be located on the fitting. The process of sliding may further include sliding the overmolded attachment piece over the O-ring without moving the O-ring. In one particular embodiment, various combinations of these steps are used to eliminate creep between the fitting and the overmolded attachment piece by using shape memory.

The terms "comprising," "including," and "having," as used in the claims and specification herein, shall be considered as indicating an open group that may include other elements not specified. The terms "a," "an," and the singular form of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things are intended. The terms "preferably," "preferred," "prefer," "optionally," "may," and similar terms are used to indicate that an item, condition or step being referred to is an optional (i.e., not required) feature of the invention.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A reservoir comprising:
    a reservoir tube having a first tube end, a second tube end and a tube length wherein the first tube end is orientated opposite the second tube end along the tube length;
    one or more securing structures wherein the securing structures maintain the tube length of the reservoir tube in an overlapping circular portion, the overlapping circular portion comprising:
        a first reservoir tube layer including a substantial first circle having a circumference, and
        a second reservoir tube layer including a substantial first circle having a circumference,
        wherein the circumference of the substantial first circle of the second reservoir tube layer is greater than the circumference of the substantial first circle of the first reservoir tube layer;
    a first tube extension extending from the overlapping circular portion to the first tube end; and
    a second tube extension extending from the overlapping circular portion to the second tube end.

2. The reservoir of claim 1 further comprising:
    a first overmolded attachment piece overmolded onto the first tube end and a second overmolded attachment piece overmolded onto the second tube end.

3. The reservoir of claim 1 wherein the overlapping circular portion forms a coil.

4. The reservoir of claim 1 wherein the overlapping circular portion forms a helix.

5. The reservoir of claim 1 wherein the first tube extension and the second tube extension are substantially straight.

6. The reservoir of claim 5 wherein the first tube extension and the second tube extension are secured to one another and the overlapping circular portion by the one or more securing structures.

7. The reservoir of claim 1 wherein the first tube extension and the second tube extension are parallel.

8. The reservoir of claim 2 further comprising
    an inlet tube having an inlet fitting inserted into a bore of the overmolded attachment piece of the first tube end; and
    an outlet tube having an outlet fitting inserted into a bore of the overmolded attachment piece of the second tube end.

9. The reservoir of claim 8 wherein the inlet fitting is secured to the overmolded attachment piece of the first tube end by shape memory.

10. The reservoir of claim 8 wherein the inlet fitting is overmolded onto the inlet tube and the outlet fitting is overmolded onto the outlet tube.

11. The reservoir of claim 8 wherein the reservoir tube has an inside diameter greater than an inside diameter of the outlet tube.

12. The reservoir of claim 8 wherein the reservoir tube has an inside diameter less than an inside diameter of the outlet tube.

13. A process for forming a reservoir comprising the steps of:
    engaging a reservoir tube at an engagement point adjacent a first end of the reservoir tube where the reservoir tube includes:
        the first tube end, a second tube end, and a tube length wherein the first tube end is orientated opposite the second tube end along the tube length;
        one or more securing structures wherein the securing structures maintain the tube length of the reservoir tube in an overlapping circular portion,
        a first tube extension extending from the overlapping circular portion to the first tube end,
        a second tube extension extending from the overlapping circular portion to the second tube end, and
        a first overmolded attachment piece overmolded onto the first tube end and a second overmolded attachment piece overmolded onto the second tube end;
    driving the engagement point about a first circumference forming a substantial first circle with at least a portion of the length of the reservoir tube;
    applying tension to the length of the reservoir tube to force the length of the reservoir tube into a configuration about the first circumference wherein at least a portion of the length of the reservoir tube forms a substantial second circle adjacent the first circle;
    repeating the steps of driving and applying tension to form a first reservoir tube layer extending a width of a reservoir;

returning at least a portion of the length of the reservoir tube and forming a second reservoir tube layer extending a second width of the reservoir using the same steps for forming the first reservoir tube layer at a second circumference;

securing the length of the reservoir tube forming the multiple reservoir tube layers into the overlapping circular portion using one or more securing structures.

14. The process for forming the reservoir of claim 13 further comprising:

cutting the length of the reservoir tube.

15. The process for forming the reservoir of claim 13 further comprising:

overmolding a first overmolded attachment pieces to the first tube end; and overmolding a second overmolded attachment piece to the second tube end.

16. The process for forming the reservoir of claim 13 further comprising:

securing the first tube extension of the length of reservoir tube positioned between the first tube end and the overlapping circular portion to the second tube extension of the length of reservoir tube positioned between the second tube end and the overlapping circular portion using a securing structure.

17. The process for forming the reservoir of claim 16 further comprising:

securing the first tube extension and the second tube extension to the overlapping circular portion using a securing structure.

18. The reservoir of claim 1 wherein the first reservoir tube layer includes a width different from a width of the second reservoir tube layer.

19. The reservoir of claim 1 wherein the first reservoir tube layer includes a width the same as a width of the second reservoir tube layer.

20. The reservoir of claim 8 wherein the outlet fitting is secured to the overmolded attachment piece of the second tube end by shape memory.

* * * * *